(No Model.) 4 Sheets—Sheet 1.

E. WALDRON.
FRICTION CLUTCH.

No. 595,223. Patented Dec. 7, 1897.

Witnesses.
Jesse B. Heller
J. E. Shaw

Inventor.
Edward Waldron (No Model.)　　　　　　E. WALDRON.　　　　4 Sheets—Sheet 2.
FRICTION CLUTCH.

No. 595,223.　　　　　　　　　　　Patented Dec. 7, 1897.

Witnesses.　　　　　　　　　　　　　　　Inventor.
Jesse B. Heller　　　　　　　　　　　　Edward Waldron
J. E. Shaw.

(No Model.) 4 Sheets—Sheet 3.

E. WALDRON.
FRICTION CLUTCH.

No. 595,223. Patented Dec. 7, 1897.

Witnesses.
Jesse B. Heller
J. E. Shaw

Inventor.
Edward Waldron

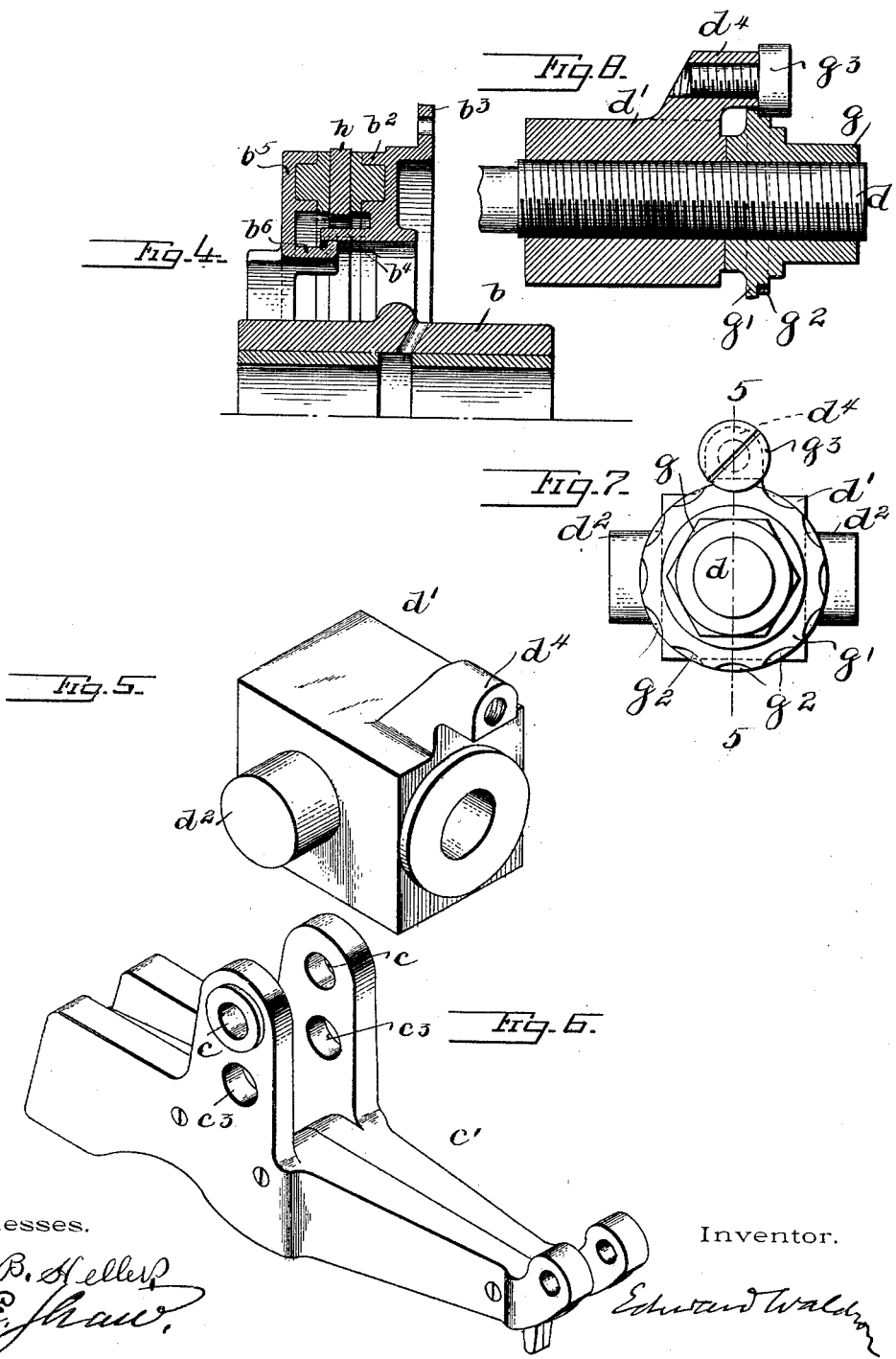

United States Patent Office.

EDWARD WALDRON, OF PHILADELPHIA, PENNSYLVANIA.

FRICTION-CLUTCH.

SPECIFICATION forming part of Letters Patent No. 595,223, dated December 7, 1897.

Application filed March 17, 1896. Serial No. 583,582. (No model.)

*To all whom it may concern:*

Be it known that I, EDWARD WALDRON, a subject of the Queen of England, residing in the city of Philadelphia, State of Pennsylvania, have invented a new and useful Improvement in Friction-Clutches, of which invention the following is a specification.

The primary object of this invention is the production of a clutch which shall be adjustable while the shaft on which it is mounted is revolving. This feature is especially valuable where the clutch is mounted on a driving-shaft carrying a number of clutches or pulleys for driving several individual machines.

Figure 1:
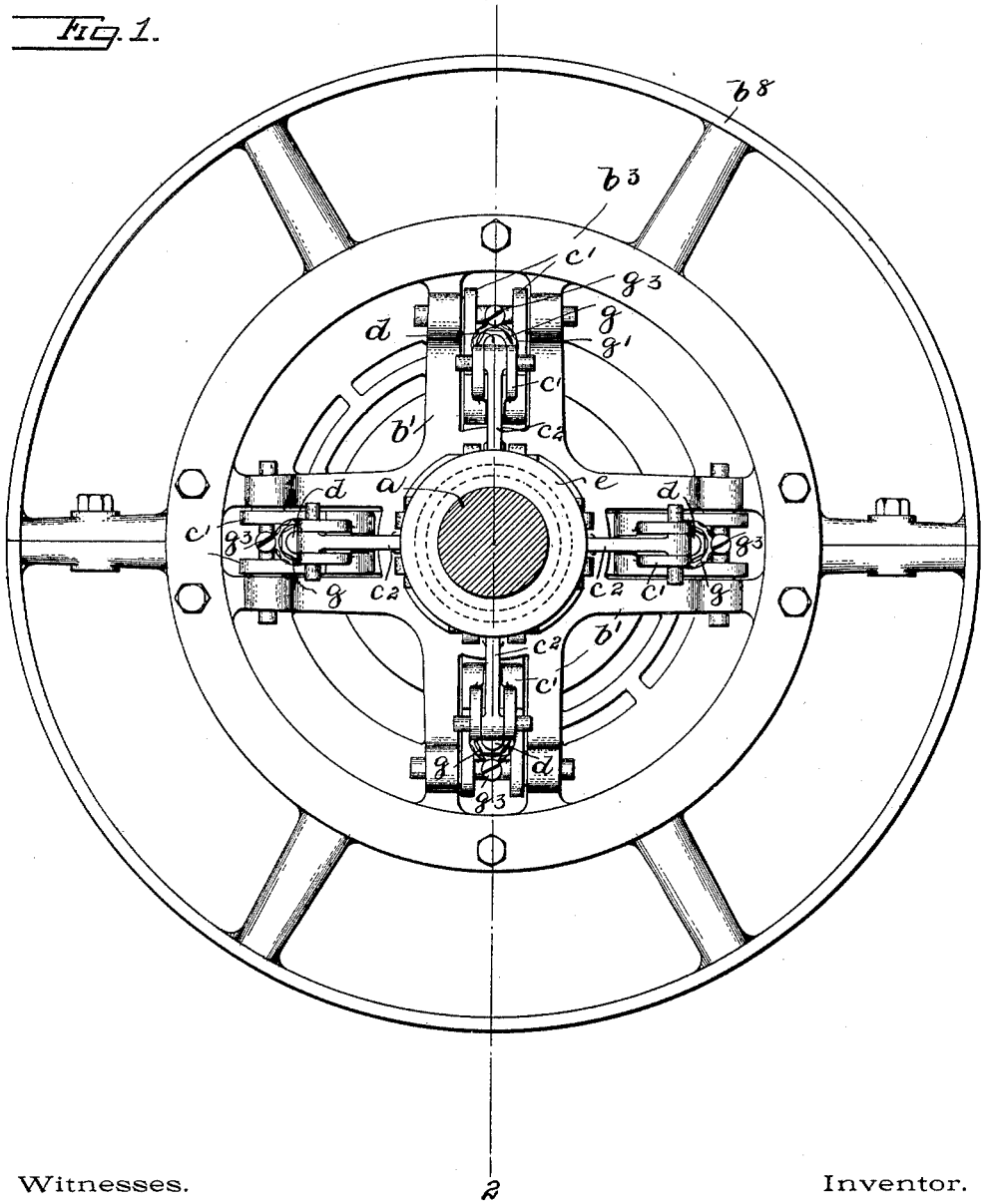
Figure 2:
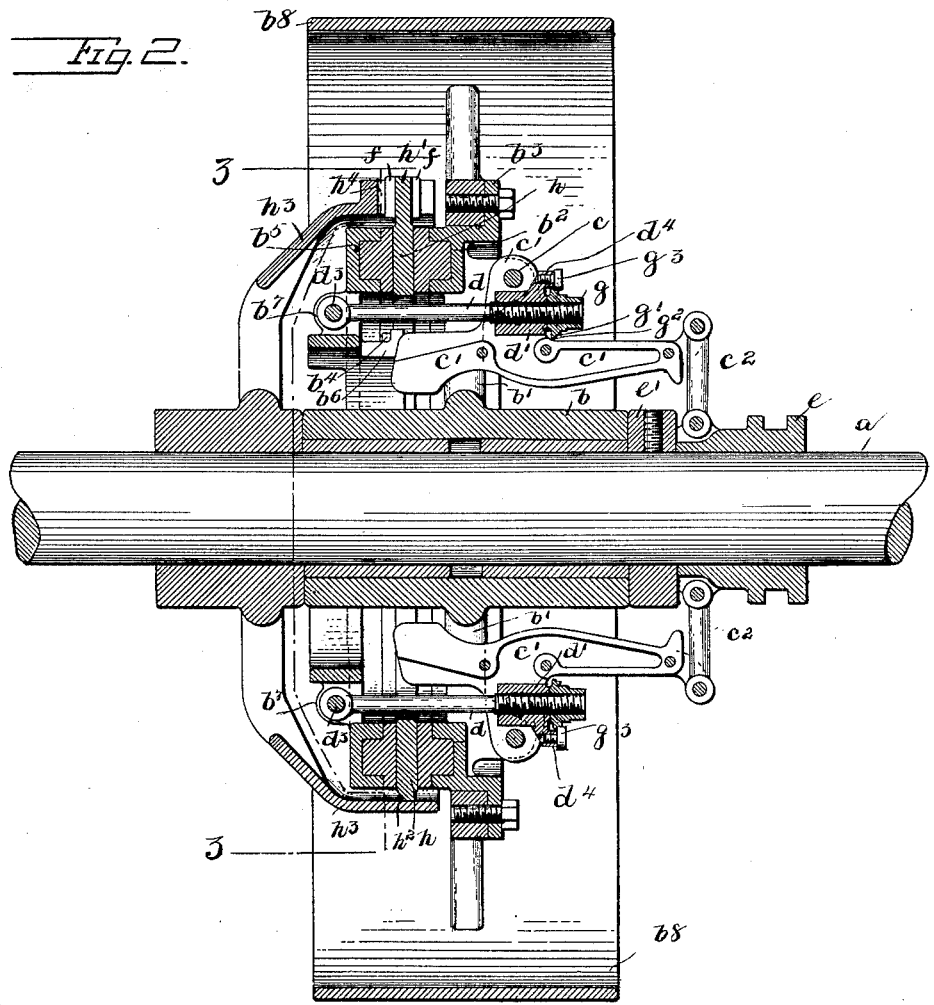
Figure 3:
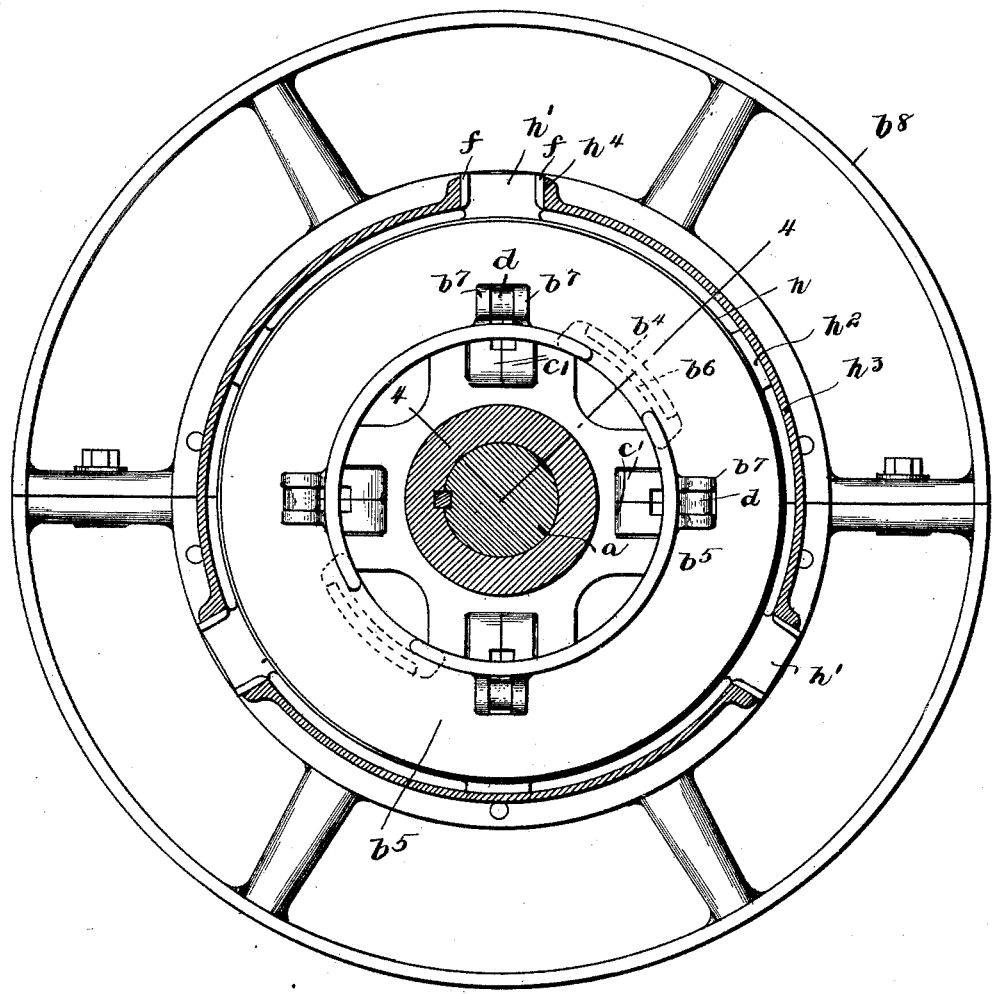

In the annexed drawings, Figure 1 is a face view of a friction-clutch embodying my invention; Fig. 2, a section of the same on line 2 2 of Fig. 1; Fig. 3, a sectional view of the clutch on the line 3 3 of Fig. 2; Fig. 4, a section of the same on lines 4 4 of Fig. 3; Fig. 5, a view in perspective of one of the swiveling guide-blocks; Fig. 6, a view in perspective of one of the levers; Fig. 7, a face view of the tension-bolt, with its adjusting-nut and set-screw, all in combination with the guide-block; and Fig. 8, a section of the same on the line 5 5 of Fig. 7.

Like letters of reference indicate similar parts in the several figures.

$a$ represents a shaft upon which is mounted a loose hub $b$, from which project radially the arms $b'$, which carry the fixed clutching member $b^2$, and said member has projecting radially from it the flange $b^3$, to which is fastened the pulley $b^8$. The arms $b'$ are arranged in pairs, and between the several pairs at $c$ the levers $c'$ are pivoted. Each of these levers is divided lengthwise into two similar parts, as shown in Fig. 6, in order that the trunnions $d^2$ of swiveling guide-block $d'$ may be readily inserted in holes $c^3$ of lever $c'$. The inner faces of the respective parts of the lever $c'$ are recessed to form a space between the short arms of this lever sufficient to freely receive the body of the guide-block $d'$, the two parts of the lever being then fastened together with screws, rivets, or other sufficient fastenings.

$d$ represents the tension-bolt, the screw end of which passes with a sliding fit through a cylindrical aperture in the block $d'$. Block $d'$ is provided with trunnions $d^2$, which fit into the holes $c^3$, bored through the short arms of the lever $c'$. The long arm of the lever $c'$ is connected to a sleeve $e$ by means of the link $c^2$, and said long arm is counterbalanced by an extension, as shown.

The fixed clutching member $b^2$ has projecting from it the flange-sections $b^4$, which pass with a sliding fit over and between the sides of the projections $b^6$, which project from the loose clutching member $b^5$, and the loose clutching member is thus carried by and held true to the fixed clutching member. The clutching member $b^5$ is provided with lugs $b^7$, and to these lugs are connected, by means of the pins $d^3$, the pivoted ends of the tension-bolts $d$, and the screw end of each of said tension-bolts projects through a swiveling guide-block $d'$, and each of said projecting ends has screwed on it a nut $g$, which abuts against its guide-block $d'$. With the object of obtaining accuracy and security of adjustment the nut $g$ is provided with a flange $g'$, and this flange is provided at regular intervals with the recesses $g^2$. The block $d'$ is provided with an arm $d^4$, which holds the set-screw $g^3$, the head of which screw overlaps the flange $g'$ and enters the required one of the several recesses $g^2$ in said flange.

$h$ is the clutch-ring. Its working position is between the clutching members $b^2$ and $b^5$. It is loosely fitted into its carrier $h^3$. It is held to rotative movement with said carrier by means of the radial projections $h'$, which extend from said ring and fit loosely into recesses $h^4$ in said carrier. The clutch-ring $h$ has also extending radially from it the projections $h^2$, which are fitted to an easy sliding contact with the inner side of the rim of the carrier $h^3$. The projections $h'$ and $h^2$ are recessed on each side, as shown, so as to make them thinner than the body of the ring, so that the ring can be faced on each side without the facing-tool coming into contact with said projections; but the sides $f$ of projections $h'$, which have frictional contact with the carrier $h^3$, are made thicker, as shown, so as to offer a larger contact-surface. The faces of the clutching members $b^2$ and $b^5$, having frictional contact with the ring $h$, are faced with wood or other suitable material. The hub of the carrier $h^3$ is keyed to the shaft $a$, and the hub $b$, which carries the levers $c'$ and the pulley $b^8$, is held in contact with the hub of the clutch-ring carrier by means of the collar $e'$, which is placed between the hub $b$ and the sleeve $e$ and is held in place on the shaft by means of a set-screw or other suitable device. It will now be seen that the clutch-ring $h$, with its carrier, must at all times revolve with the shaft, while whenever the clutch is out of engagement all of the clamping mechanism, with its adjustable parts, is stationary.

The operation of this clutch is as follows: To release from engagement, the sleeve $e$ is moved away from the collar $e'$. This causes the long arms of the levers $c'$ to swing toward the shaft and the short arms to swing toward the clutching members. The swiveling blocks $d'$ move with the short arms, each of these blocks being free to swing on its trunnions, so as to keep in line with the tension-bolt $d$, passing through it. Each respective tension-bolt has screwed on it a nut $g$, which nut, being held in contact with its swiveling guide-block $d'$ by its set-screw $g^3$, moves with said block, carrying the tension-bolt with it, and said bolt, being pinned to the clutching member $b^5$, releases it from contact with the clutch-ring $h$, which, being loosely connected with its carrier, releases itself from contact with the clutching member $b^2$. To bring the clutch into engagement, the sleeve $e$ is moved back into contact with the collar $e'$, thus forcing the long arms of the respective levers to swing outwardly from the shaft and the short arms to swing in a direction away from the clutching members, pulling the member $b^5$ into contact with the clutch-ring, which is thus forced into contact with the clutching member $b^2$ and clamped between said members.

I claim—

1. In a friction-clutch, the combination of a shaft, a sleeve movable lengthwise on said shaft, a clutch-ring carrier $h^3$, a clutch-ring loosely connected at its outer edge, to said carrier, clutching members $b^2$ and $b^5$ for grasping said ring on opposite sides thereof, the member $b^2$ nearer the sleeve being rigidly connected to the hub $b$ and the member $b^5$ which is farthest from the sleeve, having freedom of lateral motion, levers fulcrumed to the fixed clutching member $b^2$ and linked to said sleeve, swiveling guide-blocks fitted to said levers, tension-bolts $d$ passing through said guide-blocks and pivoted to the clutching member $b^6$.

2. In a friction-clutch the combination of a shaft, a sleeve movable lengthwise on said shaft, a clutch-ring carrier firmly secured to said shaft, a clutch-ring having freedom of lateral motion but held to rotative motion by said carrier, clutching members $b^2$ and $b^5$ for grasping said ring on opposite sides thereof, the member $b^2$ nearer the sleeve being rigidly connected to the hub $b$, a pulley secured substantially as shown to said member $b^2$, levers fitted with swiveling guide-blocks and fulcrumed to said member $b^2$ and linked to the sleeve, tension-bolts passing through said guide-blocks and pivoted to the clutching member $b^5$, substantially as set forth.

3. In a friction-clutch the combination of a shaft, a sleeve movable lengthwise on said shaft, a clutch-ring carrier firmly secured to said shaft, a clutch-ring loosely connected at its outer edge to said carrier, clutching members $b^2$ and $b^5$ for grasping said ring on opposite sides thereof, the member $b^2$ nearest the sleeve being rigidly connected to the hub $b$ and the member $b^5$, which is farthest from the sleeve, having freedom of lateral motion, levers fulcrumed to the fixed clutching member $b^2$ and linked to said sleeve, swiveling guide-blocks fitted to said levers, tension-bolts pivoted to clutching member $b^5$ and passing through said guide-blocks, nuts $g$ having flanges $g'$ and recesses $g^2$ on said tension-bolts, screws $g^3$ fitted into said guide-blocks and the heads of said screws engaging recesses $g^2$ in the flanges of the nuts $g$, substantially as set forth.

4. In a friction-clutch the combination of a shaft, a sleeve movable lengthwise on said shaft, a clutch-ring carrier provided with recesses $h^4$, a clutch-ring provided with projections $h'$ extending through said recesses and with projections $h^2$ in contact with the inner side of the rim of said carrier, clutching members $b^2$ and $b^5$ for grasping said ring on opposite sides thereof, the member $b^2$ nearest the sleeve being rigidly connected to the hub $b$ and the member $b^5$ which is farthest from the sleeve having freedom of lateral motion, levers fulcrumed to the fixed clutching member $b^2$ and linked to said sleeve, swiveling guide-blocks fitted to said levers, tension-bolts pivoted to the member $b^5$ and passing through said guide-blocks, substantially as set forth.

5. In a friction-clutch the combination of a shaft, a clutch-ring carrier, a clutch-ring, members for clamping the opposite sides of said ring, lever mechanism for causing said members to clamp and release said ring, projections $b^4$ extending from one of said members and having a sliding contact on three sides, with projections $b^6$ extending from the other of said members, substantially as set forth.

EDWARD WALDRON.

Witnesses:
J. E. SHAW,
LEWIS M. GRAY.